United States Patent

[11] 3,598,952

| [72] | Inventor | Cletis L. Roberson |
| | | Newark, Ohio |
| [21] | Appl No. | 420,740 |
| [22] | Filed | Dec. 23, 1964 |
| [45] | Patented | Aug. 10, 1971 |
| [73] | Assignee | Owens-Corning Fiberglas Corporation |

[54] METHOD AND APPARATUS FOR PRODUCING A STREAM FEEDER
11 Claims, 27 Drawing Figs.

[52] U.S. Cl. ........................... 219/107,
219/93, 219/99, 219/119
[51] Int. Cl. ........................... B23k11/18,
B23k 11/02
[50] Field of Search................................. 219/107,
93, 98, 87, 89, 79, 80, 103, 99, 150.5, 119

[56] References Cited
UNITED STATES PATENTS

| 1,691,779 | 11/1928 | McDonald | 219/107 |
| 1,982,098 | 11/1934 | Hartmann | 219/99 |
| 2,954,245 | 9/1936 | Cummins | 219/93 |
| 2,213,630 | 9/1940 | Gade | 219/93 |
| 2,583,868 | 1/1952 | Mociun | 219/107 |
| 2,922,542 | 1/1960 | Barr | 219/99 |
| 2,231,480 | 2/1941 | Pilger | 219/107 |
| 2,731,535 | 1/1956 | Grey | 219/119 |
| 2,931,888 | 4/1960 | Thome | 219/107 |
| 2,979,599 | 4/1961 | Width | 219/87 |
| 3,039,798 | 6/1962 | Carlson et al. | 219/107 |
| 3,089,947 | 5/1963 | Fründel | 219/107 |
| 3,219,790 | 11/1965 | Johnson | 219/93 |

*Primary Examiner*—A. Bartis
*Attorneys*—Harry O. Ernsberger and Staelin and Overman

ABSTRACT: The disclosure embraces a method of and apparatus for joining elongated bodies fashioned of platinum alloy to a floor section or plate for a glass stream feeder wherein a flange on each body is provided with a linear ridge of restricted area which is fused or welded by electric current to the floor section or plate to establish a seal or bond between the body and the plate.

PATENTED AUG 10 1971
3,598,952
SHEET 1 OF 3
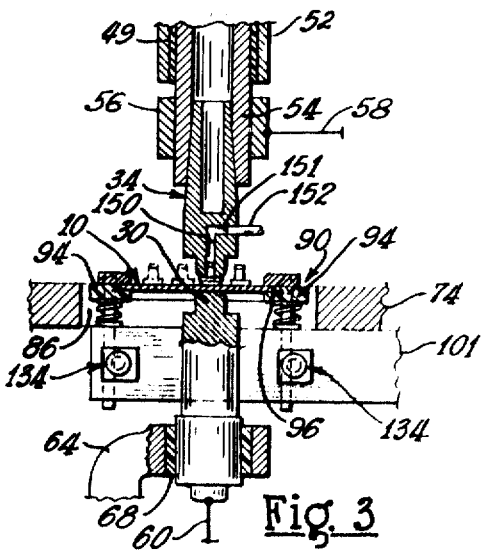
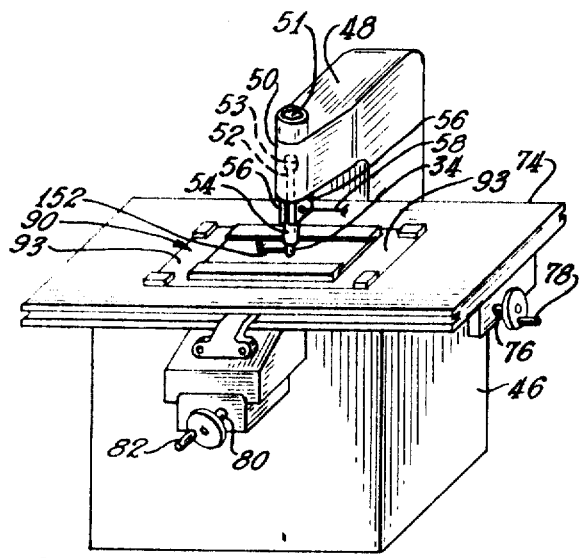
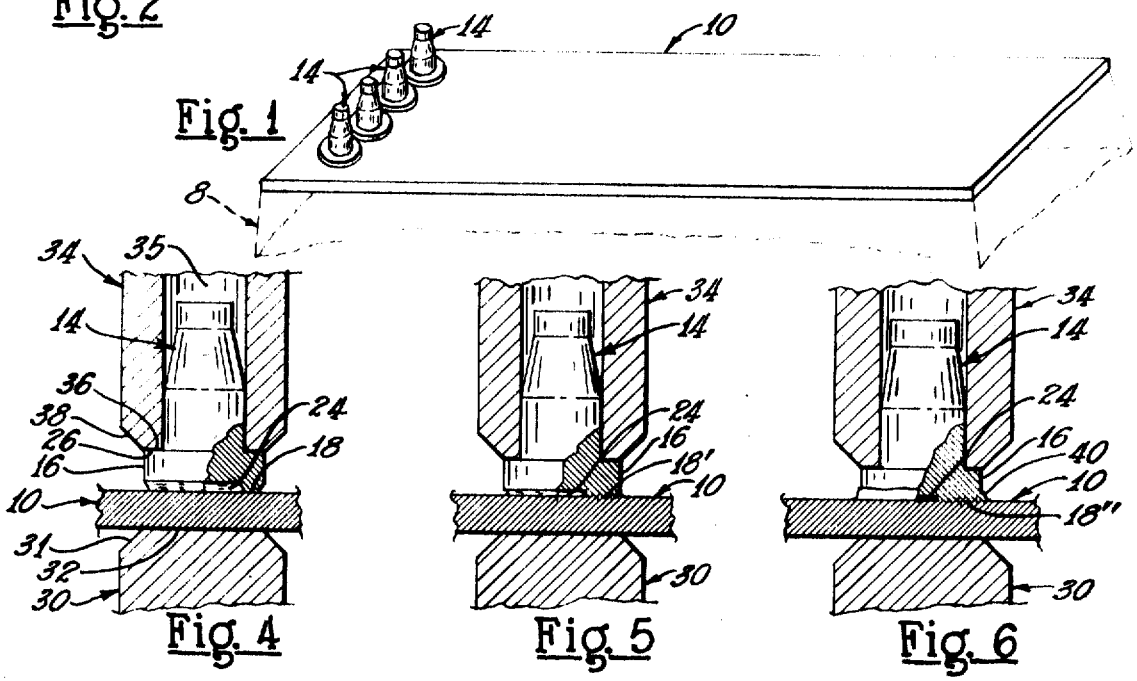
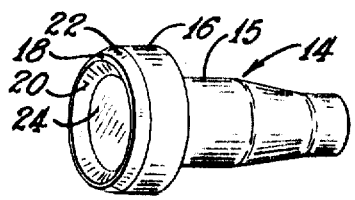
INVENTOR.
CLETIS L. ROBERSON
BY
*Hashin & Querman*
ATTORNEYS INVENTOR.
CLETIS L. ROBERSON
BY
Stachin & Opperman
ATTORNEYS

INVENTOR.
CLETIS L. ROBERSON
BY
ATTORNEYS

METHOD AND APPARATUS FOR PRODUCING A STREAM FEEDER

This invention relates to a method of and apparatus for making feeder devices or bushings for flowing streams of heat-softened mineral material, such as glass, and more especially to a method and apparatus for producing a stream flow section or tip section of a feeder or bushing.

In the art of processing heat-softenable mineral materials, such as glass or the like, into fibers or filaments and particularly continuous filaments utilized in the manufacture of textiles, it is conventional practice to employ a receptacle, feeder or bushing having a bottom wall or floor provided with a plurality of orifices through which flow streams of the heat-softened material and the streams attenuated into fibers or filaments. It has been a practice to fashion the bottom wall or floor of the feeder or bushing of platinum and rhodium alloy with projections which are manually built up by flame-fusing drops or globules of platinum and rhodium alloy at spaced regions on the floor plate and coining or shaping each projection to a generally cylindrical shape and afterwards drilling a passage in each such built-up projection to form a tubular tip for flowing a fine stream of glass.

The manual effort of building up the raised portions or projections is a tedious, time-consuming and costly operation and requires highly skilled operators.

Developments in the art of forming textile fibers or filaments of glass is toward the production of textile strands of extremely fine filaments wherein hundreds of filaments comprising one strand are drawn from streams of heat-softened glass from a single feeder or bushing. It therefore becomes imperative to fashion the orificed projections in close relation with proper spacing of the tips or projections in order to promote a uniform heat pattern throughout the area of the tip section. The tips must be of identical shape and size with orifices or passages of uniform size in order that the fine filaments or fibers attenuated from the streams are of uniform character.

Endeavors have been made to fabricate or manufacture a feeder or bushing tip section by drilling holes in a plate, inserting flanged eyeletlike members in the openings and welding flanges on the eyelets to the floor or bottom plate to form a tip section. A method of this character is disclosed in the Leedy and Russell U.S. Pat. No. 2,933,590. In this method the entire flange of an eyelet member is fused during welding. The electrode, being in direct contact with the heat-softened or fused metal of the eyelet member, fosters a tendency for the eyelet member to become contaminated with the metal of the electrode.

The present invention relates to a method of joining an elongated body, tip or projection fashioned of platinum alloy to a feeder floor section or plate wherein the metal of a linear ridge of restricted area between the elongated body and the floor section is fused to establish a seal or bond between the elongated body and the plate which is not impaired or adversely affected in use when subjected to continuous high temperatures of heat-softened or molten glass.

Another object of the invention resides in a method of producing a tip section for a stream feeder or bushing wherein elongated bodies or members are joined with a section or plate of platinum alloy by fusing or welding in a manner whereby the welding electrodes engage an elongated member and the plate at regions spaced from the area of fusion and thereby avoid contamination of the projection or plate by the material of the electrodes.

Another object of the invention resides in a method of supporting the tip section plate in a manner to facilitate normalizing or stabilizing movement thereof during a welding operation to assure proper contact of an elongated body with the plate whereby to promote the establishment of an effective weld or bond between each individual projection and the plate.

Another object of the invention resides in a method of supporting the plate of the tip section in a manner to effect an equalizing or normalizing adjustment of the plate just prior to the welding or fusing of a projection to the plate to compensate for any irregularity of the plate and effecting a locking of the plate in adjusted position during a welding operation to prevent relative movement of the plate during welding and the cooling of the fused metal to solidification.

Another object of the invention resides in a method of joining elongated members of platinum alloy to a plate of platinum alloy wherein the members are disposed in close relation so as to facilitate the fabrication of a feeder tip section or plate having a large number of projections provided by the elongated members throughout the area of the plate to facilitate the delivery of a large number of streams of glass or other heat-softenable material through orifices fashioned in the projections.

Another object of the invention resides in an apparatus for welding or fusing elongated members or bodies to a plate or floor section of a stream feeder or bushing of a character wherein the bodies are disposed in close relation and wherein each projection is individually fused or welded to the plate or floor section.

A further object of the invention resides in an apparatus adapted for welding small elongated members or bodies to a plate wherein the bodies are carried by or retained in a welding electrode under the influence of reduced pressure whereby proper positioning of each member or body on the plate or floor section is assured.

Another object of the invention is the provision of an elongated member or body for use as an orificed projection of a stream feeder or bushing wherein the elongated member or body is provided with a linear ridge or bead fashioned with a knife edge or terminal region of restricted area which is engaged under pressure with a surface of the floor plate of a stream feeder whereby the member or body may be welded through the linear ridge to the floor plate with a minimum of electric current and without appreciable fusion of the metal of the plate.

Another object of the invention resides in engaging an elongated body with an electrode and engaging a plate to which the body is to be welded by an electrode wherein the electrodes are of a shape and character to establish current flow through a linear ridge of restricted area on the projection and through an adjacent region of the plate whereby the body is welded or bonded to the plate without setting up appreciable stresses in or distortion of the plate.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is an isometric view of a portion of a stream feeder or bushing embodying a tip section illustrating elongated bodies or projections welded or bonded to the tip section through the method of the invention;

FIG. 2 is an isometric view of one form of apparatus for welding or fusing elongated bodies or projections to a plate in accordance with the method of the invention;

FIG. 3 is a detail sectional view illustrating engagement of the electrodes with an elongated body and plate illustrating a mounting means for the plate;

FIG. 4 is an enlarged sectional view illustrating engagement of a projection or body with a plate preparatory to initiating a welding operation;

FIG. 5 is a sectional view illustrating the projection and plate configuration during fusion in forming a weld;

FIG. 6 is a view similar to FIG. 5 showing a completed weld or fusion of a body to the plate;

FIG. 7 is an isometric view of one form of elongated body or projection particularly illustrating a linear ridge of restricted area for welding purposes;

FIG. 21 is a view of the opposite end of the body shown in FIG. 19 illustrating a rectangularly shaped linear ridge of restricted area for welding purposes;

Figure 10:
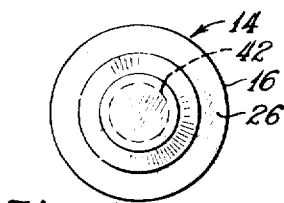
FIG. 10 is a view of the opposite end of the body shown in FIG. 8.

While the method and apparatus of the invention have particular utility in producing effective sealing welds between elongated bodies or projections formed of platinum or an alloy of platinum and a floor or plate section of a feeder formed of an alloy of platinum wherein the bodies or projections are provided with passages for flowing streams of heat-softened or molded mineral material, such as glass, from the feeder, it is to be understood that the method and apparatus may be employed wherever it may be found to have utility in welding or joining bodies of platinum or platinum alloys.

With reference initially to FIG. 1, there is illustrated a portion of a stream feeder or bushing 8 comprising a floor, plate or tip section 10, portions of the side and endwalls of the stream feeder being shown in broken lines, the stream feeder and floor or tip section being shown in inverted position.

A plurality of elongated bodies, projections or tips 14 are welded to the lower surface of the plate section 10 which are provided, preferably subsequent to welding, with orifices or passageways through which flow streams of heat-softened fiber- or filament-forming material, such as glass, contained in the feeder.

The floor, plate or tip section 10 of the feeder is fashioned of high-temperature-resistant material such as an alloy of platinum and rhodium or other suitable material and the elongated bodies or projections 14 are likewise fashioned of platinum alloyed with rhodium or other metals. The alloy material of the bodies 14 may contain gold or other constituent fostering nonwetting characteristics for minimizing the liability of flooding of the softened glass or other fiber- or filament-forming material. The feeder construction 8 may be fashioned of a plurality of the plate sections 10 in abutting relation and welded or joined together when it is desired to derive a large number of streams of glass from a single feeder.

FIGS. 7 through 10 illustrate one form of elongated body, projection or tip member 14 especially configurated or shaped to provide a linear welding ridge or region of restricted area which is adapted to be fused to the plate 10 by welding. In the preferred method of processing, a large number of bodies 14 is welded to the feeder floor or plate 10 and the bodies subsequently drilled to provide passages or orifices for flowing streams of glass from the feeder.

Each of the elongated bodies or tip structures 14 has an enlarged head portion 16 and the terminal region of the head 16 fashioned with an annular linear ridge 18 of restricted area approaching, as far as possible, a knife edge defined by chamfered surfaces 20 and 22, the ridge 18 defining or encompassing a circular recess 24. The linear ridge 18 is engaged with the plate 10 preparatory to welding or fusing the material of the ridge to a major surface of the plate 10. The head portion 16 defines with the body or shank portion 15 a ledge or surface 26.

While the illustrations of the projections or elongated bodies 14 in FIGS. 4 through 10 are greatly enlarged for purposes of illustration, the bodies are comparatively small so that a large number of the bodies may be welded or joined to a plate 10. As an example of actual size, each elongated body or projection may be of a length of between five thirty-seconds and a fourth of an inch and the head portion 16 usually less than an eighth of an inch in diameter.

FIGS. 4 through 6 illustrate steps in the method of fusing or welding the material of the linear ridge 18 of a body 14 to the plate 10. A lower electrode 30 has a terminal surface 32 for engagement with the lower surface of the plate 10. The upper electrode 34 has a central bore 35 to telescopingly receive the shank portion 15 of an elongated body or projection 14, the annular lower end or terminal 36 of the electrode 34 engaging the surface or ledge 26 provided by the enlarged head 16. The upper electrode is preferably chamfered as shown at 38 to provide clearance to facilitate positioning the tips or bodies 14 in close relation.

As particularly shown in FIG. 4 the ledge surface 26 and the electrode terminal surface 36 are of substantial areas in comparison with the restricted area of the linear ridge 18 so that the head portion 16 will accommodate substantial current flow with a minimum of heating so as to concentrate the heating to the material of the linear ridge 18, viz. the region of highest resistance to current flow through the elongated body 14.

By engaging the electrode 34 with the ledge 26 of the head portion at a substantial distance from the region of the linear ridge 18, the fusing of the material of the ridge occurs without liability of the material at the weld becoming contaminated with the metal of the electrode.

The method of fusing or welding the material of the linear ridge 18 of an elongated body 14 to the plate 10 includes establishing pressure on the movable electrode to impinge the knife edge ridge 18 with a surface of the plate 10, which impingement, under the ram action of the electrode, flattens the knife edge to a limited extent as illustrated in FIG. 4, the extent of flattening or widening the linear ridge dependent upon the force or momentum of the movable electrode. The width of the flattened edge is usually between 0.003 and 0.008 of an inch and should not exceed approximately 10 thousandths of an inch as increased current would be required to fuse the material of the ridge. The force exerted on the linear ridge establishes full area engagement thereof with a surface of the plate 10 whereby the resistance to current flow through the linear ridge is uniform throughout its area to attain a uniform distribution of the fused material of the ridge on the plate 10. The recess 24 encompassed by the linear ridge provides a chamber or space to accommodate inward migration or flow of the fused material of the linear ridge during the welding step.

FIG. 5 illustrates the initial fusion or welding of the material of the ridge 18 to the surface of the plate 10. The area or zone of fusion is indicated at 18' in FIG. 5 wherein the fused material has spread or migrated into the recess or chamber 24 in the elongated body. This is an important feature of the method in that the current path through the linear ridge 18 aligned with the terminal surface 32 of the lower electrode 30 tends to cause the fused material of the ridge to move radially inwardly toward the axis of the elongated body 14 into the chamber or recess 24.

FIG. 6 illustrates a completed weld or fusion of the material of the ridge to a surface of the plate 10. It should be noted that the recess 24 is almost filled with the fused material while a small amount of the fused material forms a minute flange 40 of material increasing the area of the weld or integration of the material with that of the plate as indicated at 18''.

The fused or bonded region of the plate 10 and the elongated body 14 is of substantial area providing an effective sealed juncture between the body 14 and the plate without appreciable flow of the fused material outwardly of the region of the linear ridge 18. It is found that the seal provided by the weld or juncture fashioned according to the method of the invention withstands the high temperatures of molten glass without impairment of the seal.

Another important feature of the method of the invention is that a minimum of fusion of the material of the plate 10 occurs during the welding step. Due to the current flow pattern during welding through the restricted area of the linear ridge 18, the heat generated by the resistance to current flow initially fuses the material of the linear ridge 18 with a minimum of fusion of the material of the plate 10 in engagement with the linear ridge. Thus there is a minimum of stress or distortion set up in the plate 10 by the welding operations.

The method of welding of the invention effects the fusion and migration of the material of the linear ridge over a substantial area of the plate 10 as shown in FIG. 6 with a minimum of fusion of the material of the plate, such fusion being confined to the area of the plate contiguous with the fused material of the linear ridge. By confining the heating and fusion of material to that of the linear ridge, the elongated bodies, tips or projections may be disposed in close relation without appreciable distortion of the plate.

Figure 8:
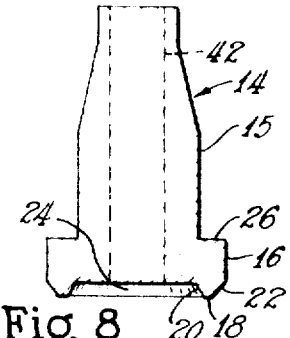
FIG. 8 is a vertical sectional view through the elongated body or projection shown in FIG. 7.
Figure 9:
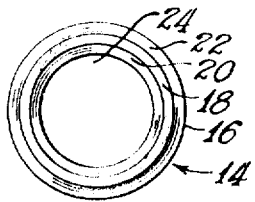
FIG. 9 is an end view of the elongated body shown in FIG. 8 illustrating the linear ridge of restricted area.

After the desired number of bodies or projections 14 are welded to the plate 10 to form a tip section of a feeder or bushing, each projection is drilled or bored, as shown in broken lines at 42 in FIG. 8, providing a passage or orifice through which flows a stream of glass or other softened material from the feeder or bushing when the same is in use.

FIGS. 2, 3, and 11 through 13 illustrate an arrangement for supporting the plate 10 during welding operations. With reference to FIG. 2, there is illustrated a welding apparatus comprising a base or frame 46 fashioned with an arm 48 provided with a head 50 bored to accommodate a precision bearing housing 51 in which is mounted a reciprocable ram 52. The ram 52 supports an electrode carrier 54 in which is mounted the upper electrode 34, the carrier being insulated from the ram by a sleeve 49 of insulating material.

Secured to the electrode carrier 54 are members 56 to which is connected a bus bar or current conductor 58 for conducting current to the electrode 34. The current conducting members 56 are reciprocable with the ram 52. The ram 52 is equipped with a piston 53 reciprocable in the housing 51. Fluid under pressure is introduced into the housing 51 alternately at opposite sides of the piston 53 by conventional valve means (not shown) to effect reciprocation of the piston, the ram and the electrode 34 to move the electrode into and away from welding position and to exert pressure through the electrode to an elongated body during a welding operation.

The frame or base of the machine is provided with bracket means 64, shown in FIG. 3, for supporting a lower electrode 30, a sleeve 68 of insulating material being disposed between the bracket means 64 and the electrode 30 to insulate the lower electrode 30 from the frame 46.

A current conductor or bus bar 60 conducts current to electrode 30. As shown in FIGS. 3 through 6, the plate-engaging portion of the electrode 30 has its end region chamfered as at 31 (shown in FIG. 4) so that the diameter of the plate-engaging surface region 32 of the electrode is approximately the same as the diameter of the head 16 of an elongated body 14.

The frame 46 of the welding apparatus is equipped with a work-carrying table or platen 74 mounted for relative longitudinal and traverse adjustment. The adjusting means for the table 74 is of conventional construction, embodying a lead screw or threaded shaft 76 extending lengthwise of the table provided with a crank means 78 for rotating the shaft to move the table lengthwise relative to the head 50. Extending transversely of the frame is a second lead screw or threaded shaft 80 provided with a conventional crank means 82 for rotating the shaft 80 to adjust the position of the table 74 in transverse directions.

Conventional means (not shown) may be provided for effecting relative vertical movement between the head 50 and the table 74. The table 74 is of planar shape and is provided with a rectangularly shaped opening 86, shown in FIGS. 3 and 11, to accommodate a mounting or supporting means for a plate or feeder floor section 10. In the embodiment illustrated, the mounting or supporting means for the plate 10 is of a yieldable character to facilitate normalizing or stabilizing the position of the plate with respect to an elongated body at each welding operation.

It is imperative that the raised linear ridge 18 on each projection 14 be engaged with the adjacent surface of the plate 10 throughout the entire linear area of the ridge in order to assure a uniform weld throughout the region of engagement of the ridge with the plate. The yieldable mounting means provides a compensating medium to accommodate slight tilting or swivel movement or adjustment of the plate 10 in order to assure full-area engagement of the linear ridge region of a projection with the plate preparatory to each welding operation.

Figure 12:
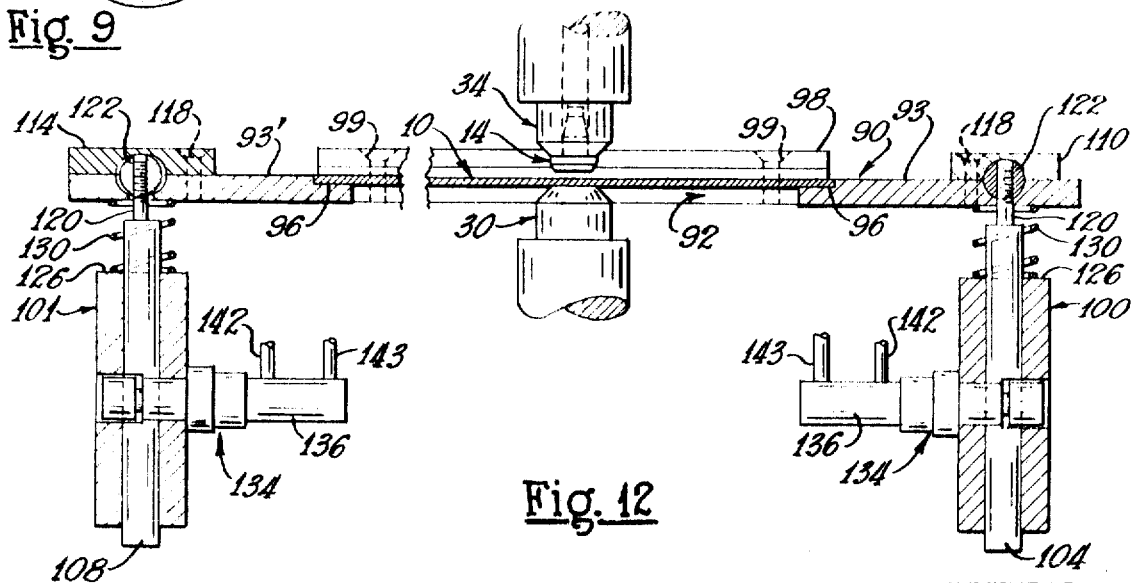
FIG. 12 is a longitudinal sectional view of the construction shown in FIG. 11 illustrating means for normalizing the position of the feeder floor or plate section with respect to an elongated body to be welded thereto.

The plate mounting means is inclusive of a rectangularly shaped supplemental frame 90 having a central opening 92 defined by transversely extending end portions 93 and 93' and longitudinal or side portions 94. As shown in FIGS. 3 and 12, the end and side portions 93, 93' and 94 are provided with recesses 96 which receive the edge regions of the feeder plate 10, positioning the plate on the table 74 so as to provide for welding operations throughout substantially the entire area of the plate except at the narrow edge regions engaged in the recesses 96.

A feeder plate section 10 is adapted to be clamped to the supplemental frame 90 by longitudinally extending clamp bars 98 secured to the side portions 94 by removable screws 99. Extending transversely of and secured to the table 74 are members or supports 100 and 101, the members 100 and 101 being disposed adjacent and beneath the end portions 93 and 93' respectively of the supplemental frame 90.

The member 101 is provided with vertical bores or passages in which are disposed shafts or plungers 104 and 105. The member 101 is likewise fashioned with vertical bores or passages accommodating shafts or plungers 108 and 109.

Figure 11:
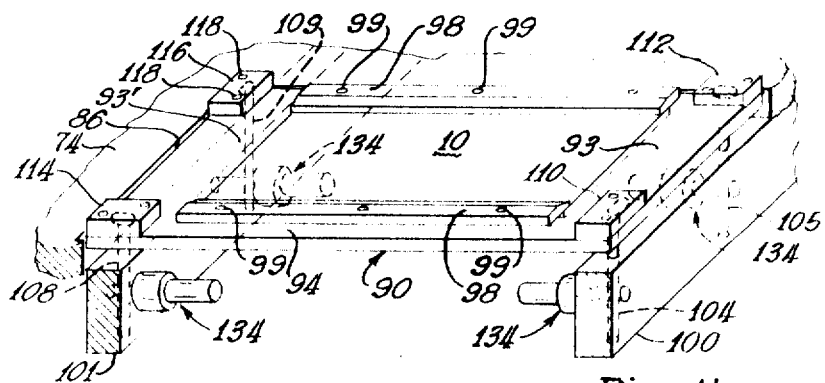
FIG. 11 is an isometric view illustrating an arrangement for mounting or supporting the floor plate or tip section for a stream feeder in proper position for welding elongated bodies or projections thereto.

Mounted upon the upper surfaces of the corner regions of the supplemental frame 90 are blocks or members 110, 112, 114 and 116, the blocks being secured to the frame 90 by screws 118. Each shaft 104, 105, 108 and 109 is fashioned with a threaded tenon 120, each threaded tenon being equipped with a spherical member or ball 122 having a threaded opening accommodating a threaded tenon, as shown in FIG. 12. With particular reference to FIGS. 11 and 12, the block 110 and the adjacent portion 93 of the frame 90 are provided with generally semispherically shaped recesses, slightly elongated in a direction transversely of the frame 90 to accommodate slight relative movement of the frame 93.

The block 114 and the adjacent region of the end portion 93' of the supplemental frame are likewise provided with generally semisperically shaped recesses but slightly elongated lengthwise of the frame, accommodating a ball 122, as shown in FIG. 12. The ball 122 nested in a recess in the block 114 shown in FIG. 12, forms an anchor for one corner region of the supplemental frame 90 and the clearance provided by the elongated recesses in the block 114 and the adjacent portion 93' provide a means permitting limited lengthwise or tilting movement of the supplemental frame with respect to the anchor point provided by the ball 122 in the recess in the block 110.

The block 116 and the adjacent frame portion 93' are provided with generally semispherically shaped recesses elongated in a transverse direction, that is, in a direction parallel with the elongation of the recesses in the block 110 and the adjacent region of portion 93. The recesses in block 116 and the adjacent portion 93' accommodate a ball 122 carried on the upper end of the shaft 109. The block 112 and the adjacent portion 93 are formed with generally semispherically shaped recesses to accommodate a ball 122 on the upper end of shaft 105.

The recesses in the block 112 and the adjacent portion 93 are elongated lengthwise of the table 74 and substantially parallel with the elongated recesses in the block 114 and the adjacent region of portion 93'. Disposed between the upper surfaces 126 of the members 100 and 101 and the lower surfaces of the supplemental frame 90 are expansive coil springs 130. The springs 130 are fashioned to exert a slight, upwardly directed biasing force just sufficient to normally support the plate 10 in contact with or slightly above the upper terminal surface of the lower electrode 30.

The springs 130 are comparatively weak and provide a yieldable mounting so that when the linear ridge of an elongated body or projection 14, carried by the upper electrode 34, engages the upper surface of the plate 10, any irregularity of the linear ridge 18 on the elongated body effects a tilting movement of the plate 10 so that the linear ridge squarely and completely engages the plate 10 throughout the entire area of the ridge to assure a uniform weld. This action takes place before current is supplied to the electrodes to form a weld.

Figure 13:
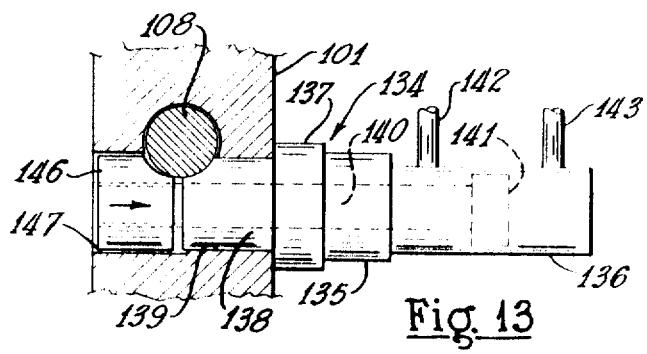
FIG. 13 is an enlarged fragmentary detail view of an arrangement for locking the plate section mounting means in welding position.

Means is provided associated with the shafts 104, 105, 108 and 109 for locking the shafts and hence the supplemental frame 90 and the plate 10 in position immediately after the position of the plate 10 is normalized with respect to the elongated body or projection in the manner described. A form of shaft-locking means or locking unit 134 is shown in FIG. 13, a locking unit being provided for each of the shafts. The locking means shown in FIG. 13 is carried by the member 101 and is adapted to lock the shaft 108 and the ball 122 carried thereby in the positions to which they may be moved by contact of an elongated body 14 with the plate 10.

Each locking means 134 is inclusive of a body 135 provided with a fluid-receiving cylinder 136, a flange or collar portion 137 and a hollow tenon portion 138 which is snugly fitted into a bore 139 in the member 101. The collar 137 engages a surface of member 101 to properly position the body 135 with respect to the member 101. The body 135 is bored to slightly accommodate a piston rod 140 equipped with a piston 141 reciprocable in the cylinder 136.

Tubular means 142 and 143 are adapted to be alternately supplied with fluid under pressure from a supply, the fluid pressure moving the piston 141 to lock or release the shaft 108. Secured to the distal end of the piston rod 140 is a locking member 146 which fits into a bore 147 of slightly larger diameter than the locking member 146.

All of the cylinders 136 of the four locking units 134 are connected through tubes 142 and 143 with a conventional valve means (not shown) so that pressure fluid introduced through the tube 142 into each cylinder 136 exerts pressure against each piston 141 in a direction to move the adjacent locking member 146 into wedging or locking engagement with the adjacent shaft so that each of the shafts 104, 105, 108 and 109 is simultaneously and automatically locked in position to hold the plate 10 in an adjusted or normalized position.

The valve means for controlling flow of fluid into and out of the cylinders 136 is programmed so that upon contact of the ridge 18 of an elongated body 14 with the plate 10 normalizing or adjusting the plate automatically under the yielding influence of the springs 130, the locking devices are actuated to lock the shafts. Immediately after the initiation of locking action of each of the locking units, current is caused to flow through the electrodes 30 and 34, the elongated body 14 carried by the electrode 34 and the plate 10 to heat and fuse the material of the linear ridge 18 with the adjacent surface area of the plate 10 to weld the elongated body 14 to the plate. It is to be understood that other suitable means may be employed to lock the shafts 104, 105, 108 and 109 in position holding the plate 10 in normalized position.

The reciprocation of the ram 52, carrying the electrode 34, under the influence of fluid pressure is programmed and the pressure on the electrode 34 controlled to provide for movement of the electrode to impinge the linear edge of the ridge 18 against the plate 10 to flatten the edge and to maintain pressure on the elongated body 14 to effect a proper weld of the body with the plate.

The duration of current flow is programmed or timed by conventional means to complete a weld by fusing only the material of the linear ridge 18 and the adjacent surface region of the plate 10, a completed weld being illustrated in FIG. 6.

The table 74 carrying the supplemental frame 90 and a plate 10 to which the projections or bodies are being welded is adjusted after each weld to move the plate 10 to a position for welding the next succeeding body or projection 14 thereto.

Reduced pressure means is utilized to temporarily secure or mount each elongated body or projection 14 in engagement with the electrode 34 preparatory to a welding operation. As shown in FIG. 3, the central axial region of the electrode 34 is provided with a bore or passage 150 communicating with a bore 151 which is connected by flexible tubular means 152 with a source of reduced pressure or vacuum such as a conventional suction pump.

In the mounting of an elongated body 14 in the electrode 34, the operator inserts the shank portion of the body in the bore 150, the shank of the body substantially obstructing the entrance to the bore 150 whereby the reduced pressure in the bore 150 retains the elongated body in telescoped relation with the electrode 34 as shown in FIGS. 3 through 6.

In effecting a welding operation, a current of high amperage and low voltage is flowed through the electrodes, the body 14 and the plate 10. The current flow for each weld is of a duration of a small fraction of a second, viz. one-sixtieth of a second or less.

Succeeding welding operations are performed in the manner above described, the table being indexed after each weld is completed until the desired number of elongated bodies, tips or projections 14 have been welded to the plate 10 forming a tip section of a stream feeder. The assembly of plate and projections or bodies secured thereto is subsequently processed to drill the passages or bores of the character shown at 42 in FIG. 8 lengthwise and through the bodies whereby each drilled body is adapted to flow a stream of heat-softened glass or other material from the supply in the stream feeder 8.

Figure 14:
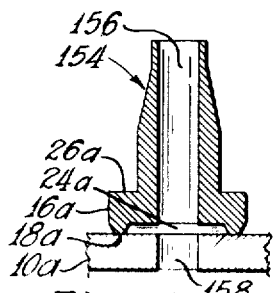
FIG. 14 is a sectional view of a form of elongated tubular body or projection and plate section in engaging relation preparatory to welding.
Figure 15:
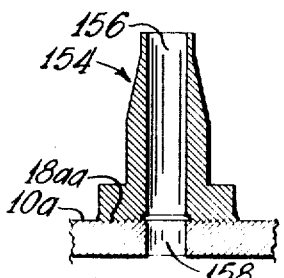
FIG. 15 illustrates the tubular projection and plate section of FIG. 14 illustrating a completed weld.

FIGS. 14 and 15 illustrate a modified form of elongated body or projection 154 of the same general shape as the projection or body 14 shown in FIG. 8. In this form the body 154 is preformed or drilled to provide a passage 156 prior to a welding operation. FIG. 14 illustrates the plate 10a predrilled with a passage 158 aligned with the passage 156 when the body 154 is in a position for welding the linear ridge 18a to a major surface of the plate 10a. In welding a body 154 to a plate 10a, the electrode 34, shown in FIG. 4, has its end region engaged with the surface 26a of the head 16a so that only the material of the linear ridge 18a is fused during welding of the projection to the plate 10a.

FIG. 15 illustrates the construction of FIG. 14 after a weld has been completed. The material of the linear ridge has been fused and welded to the adjacent surface of the plate 10a as shown at 18aa, the fused material in forming the weld moving inwardly toward the axis of the body and substantially filling the recess or chamber 24a shown in FIG. 14. From FIG. 15 it will be seen that a comparatively large weld area is obtained without dispersing the fused material outwardly of the head portion of the projection or elongated body 154. By reason of the annular shape of the weld area, the passages 156 and 158 in the body 154 and the plate 10a provide a single continuous flow passage for heat-softened material.

Figure 16:
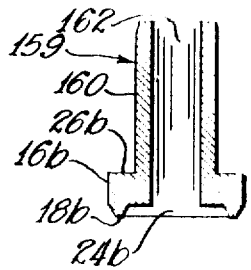
FIG. 16 is a sectional view illustrating another form of tubular elongated body or projection having a linear welding ridge of restricted area.

FIG. 16 illustrates an elongated body, projection or tip 159 having a head portion 16b, a continuous linear ridge 18b of restricted area defining or encompassing the recess 24b. In this form of elongated body, the shank portion 160 is of circular cylindrical shape and is drilled to provide a stream flow passage 162. In welding the construction 159 to a feeder floor or plate section, the upper electrode, of the character shown at 34 in FIG. 4, engages the ledge 26b provided by the head 16b so that welding is effected at the region of the linear ridge in the same manner as described in connection with the construction shown in FIGS. 4 and 5.

Figure 17:
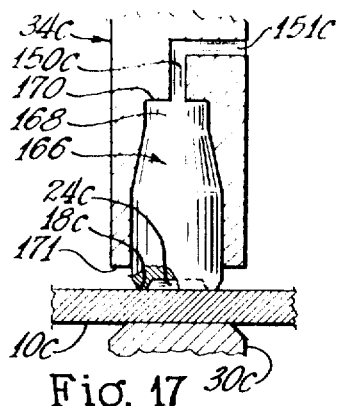
FIG. 17 is a sectional view illustrating an assembly of the upper and lower electrodes, a plate section and a modified form of elongated body preparatory to a welding operation.

FIG. 17 is illustrative of an elongated body provided with a linear or raised ridge of restricted area fashioned on the body without an enlarged head portion. In this form the elongated body 166 is provided with a linear ridge 18c defining or encompassing a recess 24c. The linear ridge or raised region 18c is adapted to be welded to a major surface of the planar body or plate 10c. A lower electrode 30c is adapted to engage the lower or opposite surface of the plate 10c, in the manner shown in FIG. 17. A head portion is eliminated from the body 166.

The body is mounted in a hollow electrode 34c wherein the upper end 168 of the body 166 is in direct engagement with an abutment surface 170 formed interiorly of the electrode 34c. The body 166 is temporarily maintained in telescoped relation with the electrode through reduced pressure communicated to the interior of the electrode through the passages 150c and 151c, as described in connection with the construction shown in FIG. 3. The body 166 substantially obstructs the entrance to passage 150c so that the differential or reduced pressure retains the body 166 in assembly with the electrode 34c during welding operations.

As the upper end portion 168 of the body 166 is in abutting contact with the interior surface 170 of the electrode, substantial area is provided between the electrode and portion 168 to accommodate current flow through the body and through the restricted linear ridge 18c to heat and fuse the material of the raised region or ridge 18c without appreciable heating of the remaining portions of the body 166.

The terminal region 171 of the upper electrode, during welding operations, is spaced substantially from the plate 10c so that there is no liability of contamination of the weld by the metal of the electrode.

Figure 18:
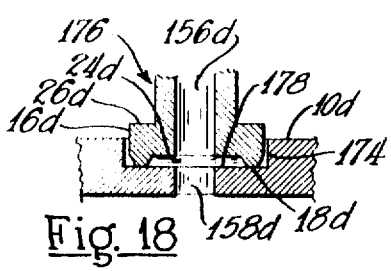
FIG. 18 is a fragmentary sectional view illustrating portions of a plate section and elongated body wherein the plate section is recessed to accommodate a portion of the elongated body.

FIG. 18 illustrates a modified form of plate section and elongated body construction. In this form the plate section 10d is provided with a recess 174 to accommodate a head 16d of an elongated body 176. In this form an end of the body 176 is fashioned with a linear ridge or raised region 18d of restricted area which defines or encompasses a recess 24d. The elongated body 176 is arranged to be telescoped into a hollow upper electrode of the character shown at 34 in FIG. 4, with the lower end of the electrode engaging the ledge or surface 26d provided by the head 16d.

The body 176 may be provided with a passage 156d which is aligned with a passage 158d provided in the plate 10d at the central region of the recess 174, the passages 156d and 158d being in aligned relation. The elongated body and the plate shown in FIG. 18 are in their relative positions prior to fusing or welding of the ridge 18d to the bottom surface 178 of the recess 174.

During current flow through the body 176 and the plate 10d, the material of the ridge 18d is fused and flows or migrates inwardly in the recess 24d to establish a fused bond or weld between the body 176 and the plate 10d wherein a substantial portion of the head 16d is disposed in the recess 174.

In this form the weld area is substantially equal to the total annular area of the surface 178 of the recess as the fused material of the ridge 18d is diffused over substantially the entire area of the surface 178.

Figure 20:
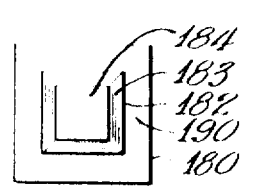
FIG. 20 is a view of the upper end of the projection shown in FIG. 19.
Figure 19:
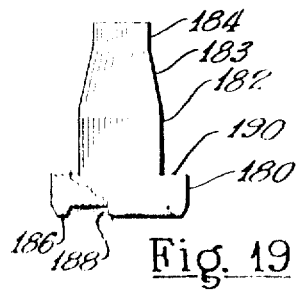
FIG. 19 is an elevational view partly in section of a projection having portions of rectangular cross section.

FIGS. 19 through 21 illustrate an elongated body for forming a streamflow tip or projection of the stream feeder in which the body is of rectangular cross section. The body is fashioned with a head 180, a shank portion 182, a tapered portion 183 and an end portion 184, these portions being of rectangular cross section. The linear ridge 186, shown in FIGS. 19 and 21, is continuous and of rectangular configuration, the ridge being of restricted area. The rectangularly shaped continuous ridge 186 encompasses or defines a recess 188 as in the other forms of elongated body construction hereinbefore described.

In welding a body of the character shown in FIGS. 19 through 21 to a plate section, the rectangularly shaped linear ridge 186 engages the plate throughout the full area of the ridge, and the end region of the upper electrode, such as the electrode 34 shown in FIG. 4, engages the ledge or surface 190 provided by the head 180. During welding, the fused material of the ridge 186 flows or migrates inwardly to provide a weld of rectangular area, the fused material moving inwardly into the recess 188. The projection or body 182 is drilled to provide a flow passage, and molten glass will not escape at the sealed region provided by the weld.

Figure 22:
FIG. 22 is a fragmentary sectional view illustrating engaging portions of a plate section and elongated body with the linear welding ridge of restricted area provided on the plate section.

FIG. 22 illustrates a modified construction of elongated body and planar body or plate wherein a raised continuous linear region is provided on the plate for engagement with a planar end surface of an elongated body. The plate 192 is provided or shaped at each zone where it is desired to weld a tip or elongated body, with a closed continuous raised region or ridge 194 which engages a surface 196 at an end of the elongated body 198. The body 198 is provided with a head 200 of a diameter slightly larger than the diameter of the circular linear ridge 194 shown in FIG. 22.

Electrodes 30 and 34 of the character hereinbefore described may be employed in welding the body 198 to the plate 192. The current flow between the body and the plate, being concentrated at the restricted linear region 194, fuses the material of the linear region to weld the head portion 200 of the body to the adjacent surface of the plate 192. The linear ridge 194 defines a circular recess 197 and, during fusing of the material of the linear ridge, the fused material flows or migrates inwardly to occupy the recess 197 as in other forms of construction hereinbefore described.

By reason of the fusion of the material of the raised ridge or region 194, a weld region of substantial area is provided between the head 200 and the adjacent zone of the plate section 192. In this form of the invention, the electrodes are spaced from the region of fusion so that there is no liability for contamination of the weld by material of an electrode.

Figure 23:
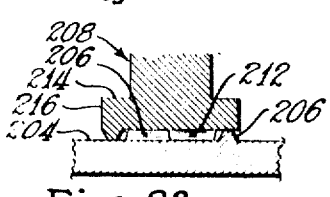
FIG. 23 is a fragmentary sectional view illustrating a portion of a plate section and an elongated body wherein the body and plate section are provided with linear raised areas arranged for interlocking engagement preparatory to welding to form a linear welding ridge configuration of restricted area.
Figure 24:
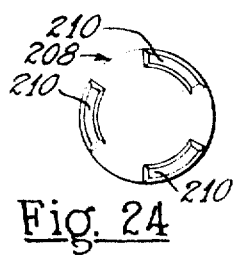
FIG. 24 is an end view of the elongated body shown in FIG. 23 illustrating the spaced raised linear ridges.

FIGS. 23 and 24 illustrate an elongated body and plate construction wherein both the elongated body and the plate or planar body are each provided with spaced raised linear regions dimensioned to be interengaged or intermeshed, as shown in FIG. 23, so that when the body and plate are engaged as shown in FIG. 23, linear regions of restricted area form a closed path or annular zone.

The plate 204 is provided with spaced raised regions 206 and the elongated body 208 provided with reciprocally shaped raised regions or zones 210 which are dimensioned to interengage in the spaces between adjacent raised portions 206 to provide an annular closed configuration of circular shape defining or encompassing a central recess or region 212. In the operation of welding the elongated body 208 to the plate 204, the current flow is concentrated at the regions of the interengaged raised portions 206 and 210 fusing the material of these portions.

The fused material migrates or moves inwardly into the recess 212 and forms a weld of the fused material which is of substantial area to provide an effective seal between the body 208 and the plate 204. In this form of construction, the upper electrode engages a ledge 214 provided by the enlarged head 216, and the lower electrode engages the lower surface of the plate 204 remote from the region of fusion so as to avoid contamination of the weld by material of the electrodes.

Figure 25:
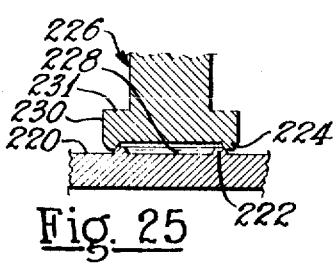
FIG. 25 is a fragmentary view illustrating portions of a plate section and elongated body wherein the plate section and body are provided with raised linear ridges of restricted area in engaged relation preparatory to the welding operation.

FIG. 25 illustrates another modification of an elongated body and plate construction. In this form the plate 220 is provided with a raised annular ridge or region 222 which is interengaged with an annular linear region 224 of restricted area formed on an elongated body 226. The linear ridges 222 and 224 are of slightly different diameters so as to nest or interlock, as shown in FIG. 25, defining or encompassing a recess 228. The linear ridge 224 is formed on the head portion 230 of the body 226. These components in FIG. 25 are shown in interengaged relation preparatory to a welding operation.

In effecting a weld, current flow through the plate 220 and the elongated body 226 is concentrated through the restricted annular area of engagement of the ridge 222 with the ridge 224 whereby the material of the ridges flows inwardly into the recess 228 to form an effective weld of large area between the body 226 and the plate 220. The upper electrode, such as electrode 34, engages the ledge 231 provided by the head 230, and the lower electrode engages the lower surface or plate 220, the electrodes being remote from the zone of fusion to avoid contamination by the material of the electrode.

Figure 26:
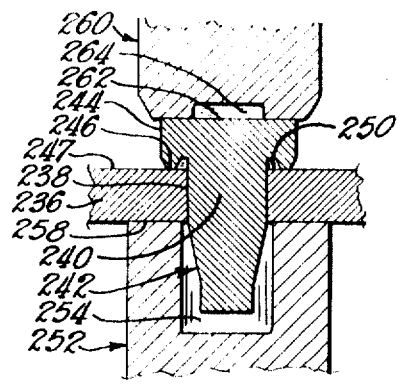
FIG. 26 is a fragmentary sectional view illustrating a plate section and elongated body wherein the shank of the body extends through an opening in the plate section with a linear welding ridge of restricted area provided on the projection.

FIG. 26 illustrates another form of elongated body and plate construction. The plate 236 is provided with an opening 238 to receive the shank portion 240 of an elongated body 242.

The elongated body has an enlarged head 244 fashioned with a circular linear raised ridge or region 246 of restricted area, the ridge 246 being adapted to engage a surface 247 of the plate 236. The linear ridge 246 defines or encompasses an annular recess 250. The linear ridge 246 is in engagement with the surface 247 of the plate 236 and the shank 240 of the elongated body extends through the opening 238 in the plate 236.

FIG. 26 illustrates the engagement of the plate 236 with the linear ridge of the body 242 preparatory to welding. The lower electrode 252 is provided with a clearance space or bore 254 to accommodate the adjacent portion of the elongated body but out of engagement therewith so that only the annular terminal surface 258 of the electrode 252 engages a surface of the plate 236. The upper electrode 260 engages the upper surface 262 of the head portion 244 of the elongated body throughout an annular region.

The upper electrode is provided with a central chamber or recess 264 to promote concentration of welding current through the annular region of the head 244 of the body 242 in alignment with the linear ridge 246. Through this character of engagement of the electrodes with the body 242 and the plate 236, the region of fusion at the linear ridge 246 is remote from the electrodes so that a weld is effected without contamination by the material of the electrodes.

During fusion of the linear ridge 246, the fused material of the ridge fills the recess 250 to provide a substantial weld area between the head 244 of the body 242 and the upper surface area 247 of the plate 236.

It is to be understood that the elongated bodies shown in FIGS. 17 and 19 through 26 are without passages at the time of welding same to a plate section. After the required number of elongated bodies is welded to a plate section, the bodies are drilled to provide streamflow passages such as the passages shown in the constructions illustrated in FIGS. 14, 15, 16 and 18.

Figure 27:
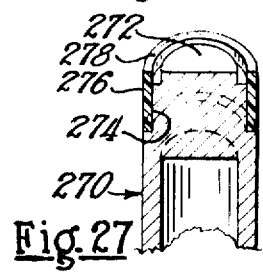
FIG. 27 is a fragmentary isometric view partly in section of a modified form of electrode for engagement with the plate section.

FIG. 27 illustrates a modified form of electrode for engagement with a planar body or plate section for a feeder to assist in stabilizing or normalizing the plate through the mounting construction shown in FIG. 11. The metal electrode 270 has a central tenon portion 272 for engagement with a region of a feeder plate section during welding operations. The electrode 270 is provided with a peripheral circular recess 274 snugly receiving a sleeve or member 276 preferably fashioned of nonconducting material such as Delrin (polyoxymethylene), or other suitable material.

The upper surface area 278 of the sleeve 276 is preferably on a plane of the surface of the tenon 272 or just slightly below the surface of the tenon.

In the steps of engaging an elongated body with the upper major surface of a feeder plate, the surface 278 of the sleeve 276 may engage the adjacent or lower surface of the plate to assist in normalizing or stabilizing the position of the plate carried by the mounting means shown in FIG. 11 with respect to the elongated body to secure full engagement of the linear ridge on an elongated body with the plate to assure an effective weld between the body and plate.

The reference to continuous linear raised ridge or region as used herein is intended to refer to constructions wherein the linear ridge is annular or rectangular and embraces or encompasses a closed area or recess and to refer to constructions such as shown in FIGS. 23, 24 and 25 wherein raised portions or zones are provided on both the elongated body and the feeder plate to which the body is to be welded. In the welding of the raised regions to an adjacent planar surface, the fused material is dispersed to provide a seal or weld of substantial area so that subjection of the welded tip section to high-temperature heat-softened glass will not impair the seal provided by the weld so that there is no leakage of glass from the stream feeder at the regions of the welds.

While the apparatus of FIG. 1 embodies a work supporting table which is indexible to various positions, it is to be understood that the head structure carrying the upper electrode may be arranged to be indexed to various positions.

It is to be understood that the mountings for the electrodes are of conventional character and are cooled by water or other heat transfer medium to maintain the electrodes at safe operating temperatures.

It is apparent that, within the scope of the invention, modifications and different arrangements may be made other than as herein disclosed, and the present disclosure is illustrative merely, the invention comprehending all variations thereof.

I claim:

1. The method of securing a flanged elongated body of an alloy of platinum to a planar body of an alloy of platinum wherein at least one of the bodies has a linear ridge of restricted area including disposing the planar body on a resilient support, establishing contact of a first electrode with a first major surface of the planar body, disposing an elongated body with the ridge between the bodies, effecting engagement of a second electrode with the flange of the elongated body at a zone remote from the linear ridge, exerting pressure through the electrodes on the bodies to establish intimate contact of the linear ridge with the adjacent body to normalize the position of the resiliently supported planar body with respect to the elongated body, and flowing current through the electrodes to fuse the material of the linear ridge to bond the flange of the elongated body to the planar body through the material of the ridge.

2. The method of securing an elongated metallic body provided with an outwardly extending flange having a linear ridge of restricted area to a planar surface of a metallic plate including disposing the plate on a resilient support, establishing contact of a first electrode with a first major surface of the plate, disposing an elongated body with the ridge facing a second major surface of the plate, effecting engagement of a second electrode with the flange of the elongated body at a zone remote from the linear ridge, exerting pressure through the electrodes to establish intimate contact of the linear ridge with the plate to normalize the position of the resiliently supported plate with respect to the linear ridge, and flowing current through the electrodes to fuse the material of the linear ridge and bond the elongated body to the plate through the fused material.

3. The method of forming a streamflow section of a stream feeder for flowing streams of heat-softened material by successively securing a plurality of elongated bodies to a planar body section including mounting the planar body section upon a resilient support, engaging a linear ridge of each elongated body with a major surface of the planar body section, subjecting each elongated body and planar body section to pressure to normalize the body section relative to each elongated body, locking the planar body section in normalized position, and flowing electric current through the region of the engagement of each elongated body with the planar body section to weld the elongated bodies to the planar body section.

4. The method of forming a streamflow section of a stream feeder for flowing streams of heat-softened material by successively securing a plurality of elongated bodies to a planar body section including mounting the planar body section upon a resilient support, engaging each elongated body with a major surface of the planar body section, subjecting each elongated body and planar body section to pressure to normalize the body section relative to each elongated body, locking the planar body section in normalized position, flowing electric current through the region of the engagement of an elongated body with the planar body section to weld the elongated body to the planar body section, and indexing the position of the planar body section at the completion of each weld to accommodate a succeeding elongated body to be welded to the planar body section.

5. Apparatus for joining an elongated metal body provided with an outwardly extending flange to a planar metal body wherein at least one of the bodies has a linear surface region of restricted area, in combination, resilient means supporting the planar body, a first electrode in engagement with the planar body, a second electrode engageable with the flange of the elongated body at a zone remote from the linear surface region, means to effect relative movement between the electrodes to engage the bodies under pressure to effect movement of the resiliently mounted planar body to normalize the position thereof with respect to the elongated body, and current conducting means for flowing current to the electrodes and through the linear surface region to weld the elongated body to the planar body.

6. Apparatus for forming a tip section of an alloy of platinum for a stream feeder for flowing streams of heat-softened fiber-forming material, in combination, a base, an electrode-supporting head member mounted on the base, a work-supporting member mounted on the base, said work-supporting member adapted to support a planar body for a tip section, a first electrode engaging the planar body, a second electrode mounted on said head member, means associated with said second electrode to support an elongated body by the second electrode, means for moving said second electrode toward the first electrode to engage a raised ridge on an elongated body with the planar body, current conducting means for conducting current to the electrodes and through the raised ridge to fuse and weld the material of the ridge to the planar body, and means for indexing the position of one of said members with respect to the other upon completion of a weld to accommodate successive welding of elongated bodies to the planar body.

7. Apparatus for joining elongated metal bodies to a planar metal body wherein each of the elongated bodies has a linear surface region of restricted area, in combination, resilient means supporting the planar body, a first electrode in engagement with the planar body, a second electrode mounting an elongated body, means to effect relative movement between the electrodes to engage the linear surface region of an elongated body with a surface of the planar body under pressure to effect movement of the resiliently mounted planar body to normalize the position of the planar body with the linear surface region of an elongated body, current-conducting means for flowing current to the electrodes and through the zone of engagement of the linear surface region with the planar body to weld an elongated body to the planar body, and means for indexing the position of the planar body to weld a plurality of elongated bodies to the planar body at spaced regions thereon.

8. Apparatus for securing elongated bodies to a planar body for forming a streamflow section for a glass feeder wherein each of the elongated bodies is preformed with an outwardly extending flange having a linear ridge of restricted area, in combination, relatively movable means for supporting a planar body, a first electrode disposed for engagement with the planar body, a second electrode engageable with the flange of an elongated body at a zone remote from the linear ridge, means operable to effect relative movement of one of the electrodes to engage the linear region of an elongated body with the planar body under pressure to normalize the position of the planar body with respect to the linear region, means for locking the planar body in normalized position, current-conducting means for flowing electric current to the electrodes and through the linear ridge to weld the material of the linear region to the planar body at a zone spaced from the electrodes, and means for indexing the planar body to successive positions to successively weld a plurality of the elongated bodies to the planar body.

9. Apparatus for joining elongated bodies of an alloy of platinum to a planar body of an alloy of platinum for a streamflow section of a glass feeder wherein each of the elongated bodies has an outwardly extending flange provided with a preformed linear ridge of restricted area, in combination, a base frame, a table adjustably mounted on the base frame, a head on the base frame, a first electrode mounted on the base frame, a second electrode movably supported by the head, a supplemental frame adapted to support a planar body, spring means supporting the supplemental frame on the table, the second electrode being disposed to engage the flange of an elongated body and engage the linear ridge of the elongated body with the planar body, said first electrode engaging the planar body, the engagement of an elongated body with the planar body effecting relative movement of the supplemental frame to normalize the position of the planar body with respect to the linear region of an elongated body, means for locking the supplemental frame and planar body in normalized position, and current-conducting means for flowing current through the electrodes and linear region to fuse and weld the material of the linear ridge to the planar body.

10. Apparatus for joining elongated bodies of an alloy of platinum to a planar body of an alloy of platinum for a streamflow section of a glass feeder wherein each of the elongated bodies has an outwardly extending flange provided with a preformed linear ridge, in combination, a base frame, a table adjustably mounted on the base frame, a head on the base frame, a first electrode mounted on the base frame, a second electrode movably supported by the head, a supplemental frame of rectangular shape adapted to support a planar body, yieldable means supporting the supplemental frame on the table, said yieldable means including springs disposed adjacent corner regions of the supplemental frame, a shaft adjacent each corner region of the supplemental frame and having articulate connection therewith, the second electrode being disposed to engage the flange of an elongated body to engage the linear ridge with the planar body, the first electrode engaging the planar body, the engagement of an elongated body with the planar body effecting equalizing movement of the supplemental frame to normalize the position of the planar body with respect to the linear ridge of an elongated body, fluid-pressure-actuated means for locking each of said shafts to secure the planar body in normalized position, and current-conducting means for flowing current through the electrodes and linear region to fuse and weld the linear region to the planar body.

11. Apparatus for joining elongated bodies of an alloy of platinum to a plate section of an alloy of platinum for a streamflow section of a glass feeder wherein each of the elongated bodies has an outwardly extending flange provided with a preformed linear ridge, in combination, a base frame, a table adjustably mounted on the base frame, a head on the base frame, a first electrode mounted on the base frame, a second electrode movably supported by the head, means on said table for mounting the plate section, the first electrode engaging the plate section, the second electrode engaging the flange on a body and having a recess to receive an elongated body, tubular means in communication with the recess for establishing reduced pressure in the recess to mount an elongated body on the second electrode, means for moving the second electrode to engage the linear ridge of an elongated body with the plate section, and current-conducting means for flowing current through the electrodes and linear ridge to fuse and weld the material of the linear ridge to the plate section.